US009912644B2

(12) United States Patent
Cunningham

(10) Patent No.: US 9,912,644 B2
(45) Date of Patent: Mar. 6, 2018

(54) SYSTEM AND METHOD TO COMMUNICATE SENSITIVE INFORMATION VIA ONE OR MORE UNTRUSTED INTERMEDIATE NODES WITH RESILIENCE TO DISCONNECTED NETWORK TOPOLOGY

(71) Applicant: FireEye, Inc., Milpitas, CA (US)

(72) Inventor: Sean Cunningham, Washington, DC (US)

(73) Assignee: FireEye, Inc., Milpitas, CA (US)

( * ) Notice: Subject to any disclaimer, the term of this patent is extended or adjusted under 35 U.S.C. 154(b) by 39 days.

(21) Appl. No.: 14/452,147

(22) Filed: Aug. 5, 2014

(65) Prior Publication Data

US 2016/0044000 A1   Feb. 11, 2016

(51) Int. Cl.
| | | |
|---|---|---|
| *H04L 29/06* | (2006.01) | |
| *H04L 9/14* | (2006.01) | |
| *H04L 9/30* | (2006.01) | |
| *H04L 9/32* | (2006.01) | |
| *H04L 9/08* | (2006.01) | |
| *H04L 12/24* | (2006.01) | |

(52) U.S. Cl.
CPC ........ *H04L 63/0428* (2013.01); *H04L 9/0825* (2013.01); *H04L 9/14* (2013.01); *H04L 9/30* (2013.01); *H04L 9/3263* (2013.01); *H04L 63/0823* (2013.01); *H04L 41/22* (2013.01); *H04L 63/0272* (2013.01); *H04L 63/166* (2013.01); *H04L 2209/24* (2013.01); *H04L 2209/64* (2013.01)

(58) Field of Classification Search
CPC ......... H04L 9/28; H04L 9/14; H04L 63/0471; H04L 41/22; G06F 21/56
USPC .......................................................... 713/175
See application file for complete search history.

(56) References Cited

U.S. PATENT DOCUMENTS

| | | | | |
|---|---|---|---|---|
| 6,079,020 A | * | 6/2000 | Liu | ......................... H04L 41/22 709/223 |
| 6,212,633 B1 | * | 4/2001 | Levy | .................. H04L 12/40104 380/283 |

(Continued)

OTHER PUBLICATIONS

PCT/US2015/043854 filed Aug. 5, 2015 International Search Report and Written Opinion dated Dec. 22, 2015.

*Primary Examiner* — Hadi Armouche
*Assistant Examiner* — Bryan Wright
(74) *Attorney, Agent, or Firm* — Rutan & Tucker, LLP

(57) ABSTRACT

A system and method to communicate secure information between computing machines using an untrusted intermediate with resilience to disconnected network topology. The system and method utilize agnostic endpoints that are generalized to be interoperable among various systems, with their functionality based on their location in a network. The system and method enable horizontal scaling on the network. One or more clusters may be set up in a location within a network or series of networks in electronic communication, e.g., in a cloud or a sub-network, residing between a secure area of the network(s) and an unsecure area such as of an external network or portion of a network. The horizontal scaling allows the system to take advantage of a capacity of a local network. As long as an agent has connectivity to at least one locale of the network, the agent is advantageously operable to move data across the system.

32 Claims, 4 Drawing Sheets

(56) References Cited

U.S. PATENT DOCUMENTS

| | | | |
|---|---|---|---|
| 6,697,944 B1 * | 2/2004 | Jones | G06F 21/10 705/50 |
| 6,760,752 B1 * | 7/2004 | Liu | H04L 63/0428 709/206 |
| 7,937,387 B2 | 5/2011 | Frazier et al. | |
| 8,006,305 B2 | 8/2011 | Aziz | |
| 8,069,484 B2 | 11/2011 | McMillan et al. | |
| 8,107,397 B1 * | 1/2012 | Bagchi | H04L 9/0822 370/254 |
| 8,171,553 B2 | 5/2012 | Aziz et al. | |
| 8,204,984 B1 | 6/2012 | Aziz et al. | |
| 8,291,499 B2 | 10/2012 | Aziz et al. | |
| 8,370,622 B1 * | 2/2013 | Dattatreya | H04L 9/28 713/151 |
| 8,375,444 B2 | 2/2013 | Aziz et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,561,177 B1 | 10/2013 | Aziz et al. | |
| 8,566,476 B2 | 10/2013 | Shiffer et al. | |
| 8,566,946 B1 | 10/2013 | Aziz et al. | |
| 8,584,239 B2 | 11/2013 | Aziz et al. | |
| 8,635,696 B1 | 1/2014 | Aziz | |
| 8,689,333 B2 | 4/2014 | Aziz | |
| 8,713,681 B2 | 4/2014 | Silberman et al. | |
| 8,776,229 B1 | 7/2014 | Aziz | |
| 8,793,278 B2 | 7/2014 | Frazier et al. | |
| 8,793,787 B2 | 7/2014 | Ismael et al. | |
| 8,832,829 B2 | 9/2014 | Manni et al. | |
| 8,850,571 B2 | 9/2014 | Staniford et al. | |
| 8,881,271 B2 | 11/2014 | Butler, II | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,949,257 B2 | 2/2015 | Shiffer et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,104,867 B1 | 8/2015 | Thioux et al. | |
| 9,106,630 B2 | 8/2015 | Frazier et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,282,109 B1 | 3/2016 | Aziz et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,413,781 B2 | 8/2016 | Cunningham et al. | |
| 2003/0191843 A1 * | 10/2003 | Balissat | H04L 63/0281 709/227 |
| 2003/0204756 A1 * | 10/2003 | Ransom | G01D 4/004 713/300 |
| 2006/0004662 A1 * | 1/2006 | Nadalin | H04L 63/02 705/50 |
| 2007/0250930 A1 | 10/2007 | Aziz et al. | |
| 2007/0274312 A1 * | 11/2007 | Salmela | H04L 29/12009 370/392 |
| 2008/0005782 A1 | 1/2008 | Aziz | |
| 2008/0184367 A1 | 7/2008 | McMillan et al. | |
| 2008/0288577 A1 | 11/2008 | Clubb et al. | |
| 2009/0198651 A1 | 8/2009 | Shiffer et al. | |
| 2009/0198670 A1 | 8/2009 | Shiffer et al. | |
| 2009/0198689 A1 | 8/2009 | Frazier et al. | |
| 2009/0199274 A1 | 8/2009 | Frazier et al. | |
| 2009/0222902 A1 | 9/2009 | Bender et al. | |
| 2010/0023766 A1 * | 1/2010 | Singh | H04L 9/3273 713/169 |
| 2010/0030996 A1 | 2/2010 | Butler, II | |
| 2010/0115621 A1 | 5/2010 | Staniford et al. | |
| 2010/0192223 A1 | 7/2010 | Ismael et al. | |
| 2011/0078794 A1 | 3/2011 | Manni et al. | |
| 2011/0093951 A1 | 4/2011 | Aziz | |
| 2011/0099633 A1 | 4/2011 | Aziz | |
| 2011/0099635 A1 | 4/2011 | Silberman et al. | |
| 2011/0173213 A1 | 7/2011 | Frazier et al. | |
| 2011/0247072 A1 | 10/2011 | Staniford et al. | |
| 2011/0314546 A1 | 12/2011 | Aziz et al. | |
| 2012/0117652 A1 | 5/2012 | Manni et al. | |
| 2012/0174186 A1 | 7/2012 | Aziz et al. | |
| 2012/0210001 A1 * | 8/2012 | Ryerson | H04W 12/08 709/225 |
| 2012/0222121 A1 | 8/2012 | Staniford et al. | |
| 2012/0331553 A1 | 12/2012 | Aziz et al. | |
| 2013/0036472 A1 | 2/2013 | Aziz | |
| 2013/0047257 A1 | 2/2013 | Aziz | |
| 2013/0227691 A1 | 8/2013 | Aziz et al. | |
| 2013/0247186 A1 | 9/2013 | LeMasters | |
| 2013/0276114 A1 * | 10/2013 | Friedrichs | G06F 21/56 726/23 |
| 2013/0290704 A1 | 10/2013 | Giniger et al. | |
| 2013/0291109 A1 | 10/2013 | Staniford et al. | |
| 2013/0297802 A1 | 11/2013 | Laribi et al. | |
| 2013/0318038 A1 | 11/2013 | Shiffer et al. | |
| 2013/0318073 A1 | 11/2013 | Shiffer et al. | |
| 2013/0325791 A1 | 12/2013 | Shiffer et al. | |
| 2013/0325792 A1 | 12/2013 | Shiffer et al. | |
| 2013/0325871 A1 | 12/2013 | Shiffer et al. | |
| 2013/0325872 A1 | 12/2013 | Shiffer et al. | |
| 2014/0032875 A1 | 1/2014 | Butler | |
| 2014/0164776 A1 * | 6/2014 | Hook | H04L 9/14 713/171 |
| 2014/0181131 A1 | 6/2014 | Ross | |
| 2014/0189687 A1 | 7/2014 | Jung et al. | |
| 2014/0189866 A1 | 7/2014 | Shiffer et al. | |
| 2014/0189882 A1 | 7/2014 | Jung et al. | |
| 2014/0207854 A1 | 7/2014 | Enns et al. | |
| 2014/0237600 A1 | 8/2014 | Silberman et al. | |
| 2014/0280245 A1 | 9/2014 | Wilson | |
| 2014/0283037 A1 | 9/2014 | Sikorski et al. | |
| 2014/0283063 A1 | 9/2014 | Thompson et al. | |
| 2014/0337836 A1 | 11/2014 | Ismael | |
| 2014/0344926 A1 | 11/2014 | Cunningham et al. | |
| 2014/0365372 A1 * | 12/2014 | Ross | H04L 63/0471 705/44 |
| 2014/0380473 A1 | 12/2014 | Bu et al. | |
| 2014/0380474 A1 | 12/2014 | Paithane et al. | |
| 2015/0007312 A1 | 1/2015 | Pidathala et al. | |
| 2015/0096022 A1 | 4/2015 | Vincent et al. | |
| 2015/0096023 A1 | 4/2015 | Mesdaq et al. | |
| 2015/0096024 A1 | 4/2015 | Haq et al. | |
| 2015/0096025 A1 | 4/2015 | Ismael | |
| 2015/0180886 A1 | 6/2015 | Staniford et al. | |
| 2015/0186645 A1 | 7/2015 | Aziz et al. | |
| 2015/0220735 A1 | 8/2015 | Paithane et al. | |
| 2015/0372980 A1 | 12/2015 | Eyada | |
| 2016/0044000 A1 | 2/2016 | Cunningham | |
| 2016/0127393 A1 | 5/2016 | Aziz et al. | |

\* cited by examiner

SYSTEM AND METHOD TO COMMUNICATE SENSITIVE INFORMATION VIA ONE OR MORE UNTRUSTED INTERMEDIATE NODES WITH RESILIENCE TO DISCONNECTED NETWORK TOPOLOGY

FIELD OF THE INVENTION

The present inventive concept relates generally to computer-based network communication systems, and more particularly, to a system and method to communicate sensitive information via one or more untrusted intermediate nodes with resilience to disconnected network topology.

BACKGROUND

It has become increasingly important to stream large amounts of data in a fault-tolerant, cryptographically-secure manner and to enable redistribution of tasks being performed by a plurality of servers among the plurality of servers, particularly to address situations in which one or more of the plurality of servers fail. Conventional technology is unable to meet the demands for such technology for a variety of reasons, which include complications arising from network topology or directionality and an inability to scale existing systems. Conventional technology includes peer-to-peer transfer technology, which involves distributing and sharing digital documents and computer files using a decentralized, distributed network architecture. Although conventional peer-to-peer transfer technology is operable to transfer data across a network in a secure manner, such technology can only accommodate authenticated data and cannot accommodate encrypted data if the data is broadcast, e.g., sent to a large number of users. This shortcoming essentially renders such conventional peer-to-peer transfer technology no more efficient, and often less efficient, than other transfer technology in terms of traffic and reliability. As such, all data sent via a network using such conventional peer-to-peer transfer technology is available for viewing by all peer subsets associated with the network. Thus, a user who wishes to transfer data while maintaining its confidential nature cannot use conventional peer-to-peer transfer technology.

Thus, there exists a need for system and method to stream large amounts of data in a fault-tolerant manner, at a large scale, and in a cryptographically-secure environment.

SUMMARY

In response to the aforementioned needs, the present application describes a computerized system and method of communicating secure information between a plurality of computers with an untrusted intermediate and resilience to disconnected network topology.

In accordance with an aspect of the present disclosure, a system and method are provided that utilize agnostic endpoints that are generalized to be interoperable among various systems, with their functionality based on their location in a network. The system and method enable horizontal scaling on the network and provide complete encryption of data throughout a transfer across the network from end to end. Within this disclosure, horizontal scaling generally refers to a relative increase in the quantity of regionally separated nodes that may be accessed due to a proportional increase in the expanse of the network providing communication services to those nodes. One or more clusters may be set up in a location within a network or series of networks in electronic communication, e.g., in a cloud, a sub-network, a demilitarized zone (DMZ), or perimeter network, residing between a secure area of the network and an unsecure area such as an external network or portion of a network. The system is configured to exchange encrypted information between a backend of the system and an agent by utilizing the clusters. The clusters are configured to store encrypted information in a buffered format and authenticate the agent using public key encryption. The agent is installed via an installation process during which the agent is configured and/or authenticated by a provisioning server of a configuring cluster using public certificate technology. During the installation process, the agent is assigned one or more unique identifiers operable to work with the system and known to the clusters. Horizontal scaling allows the system to utilize a full capacity of the system. That is, the ability of the system to communicate with regionally separated nodes is essentially proportional to the extent of the medium (e.g., the network) providing connectivity to each of the nodes. As long as the agent has connectivity to at least one locale of the network, e.g., one of the clusters, the agent can move data across the system.

The aforementioned may be achieved in one aspect of the present disclosure by providing a computerized method of communicating using a system configured to exchange encrypted data via at least two servers. The method may include the steps of executing an agent in the system configured with (i) at least one internal domain naming service (DNS) address to point to one of the at least two servers, and (ii) at least one external DNS address to point to another one of the at least two servers, establishing a communication link between one of the at least two servers and the agent, signing a payload containing data using a private key to produce an envelope, and/or encrypting the envelope using a public key associated with one of the at least two servers and the agent. The at least two servers may be configured to authenticate the agent when establishing the communication link between the one of the at least two servers and the agent. An internal DNS address generally refers to an address of a trusted node, while an external DNS address refers to an address of an untrusted node (e.g., an intermediary node). Additionally, the term payload refers to useful data exchanged between at least two nodes, which does not necessarily include other data used for formatting or conveying the data using one or more communication protocols.

The method may further include the step of compressing the data prior to signing the payload. The public key may be provided by the agent. The step of executing the agent may include configuring and authenticating the agent using a certificate. The step of executing the agent may include assigning one or more unique identifiers to the agent. The at least two servers may utilize a root certificate to communicate with agent.

The agent may be provided with information associated with the at least two servers. The information may include an IP address and DNS information associated with each of the servers. The at least one of the at least two servers may be a provisioning server configured to certify the agent. The authentication of the agent may include use of a CA certificate and/or a certificate enrollment protocol. The authentication of the agent may be a two-way authentication process between the agent and the at least two servers.

The method may include the step of initiating a poll, via the agent, by generating and transmitting a signal across the system and to the at least two servers in attempt to identify a task. The signal may be sent to only one of the at least two servers at a time. The poll may be transmitted periodically or aperiodically and encrypted across the system at intervals alternating between the at least two servers. If the task is not identified, the agent may be configured to repeat the step of initiating the poll after a predetermined time period has elapsed. The agent may determine that the task has been identified if the agent receives at least one item detailing the task in response to the poll initiated by the agent. If the task is identified, the agent may be configured to (i) locate and retrieve data associated with the task, (ii) decrypt the data, (iii) generate an output associated with the data, and/or (iv) transmit the output. The output generated by the agent may be associated with a data payload or data envelope and may be compressed, signed, and/or encrypted. If the task is not identified, the agent may be configured to repeat the step of initiating the poll at a predetermined rate that is based on whether the system is experiencing a data breach.

The rate may be reset so that polls are initiated at a different and quicker rate if the system is experiencing the data breach. One of the at least two servers may be configured to reset the polling rate based on whether the system is experiencing the data breach. The agent may be configured to locate the data associated with the task via a URI. The agent may be configured to (i) retrieve the information associated with the task via a secure socket layer (SSL) connection, and/or (ii) decrypt the information associated with the task via at least one of the public key and the private key.

The aforementioned may be achieved in one embodiment by providing a computerized communication system. The system may include a processor configured to (i) compress data, (ii) sign the data using a private key, and/or (iii) encrypt data using a public key to form a data payload. The system may further include an agent configured to establish a communication link and transmit the data payload using the communication link and/or a server configured to (i) receive the data payload, and (ii) process metadata associated with the data payload to determine whether an entirety of the data payload was transmitted successfully from the processor to the server. The processor may include (i) a compressor or compression logic configured to compress the data, (ii) an authenticator or authentication logic configured to sign the data, and/or (iii) an encryptor or encryption logic configured to encrypt the data.

The system may further include a buffered memory associated with the server for use to determine whether an entirety of the data payload was received by the server from the processor. The metadata may include offset/length data related to subsets of the data to enable the data to be reconstructed if a transmission event occurs. The metadata may be compressed, signed, and/or encrypted simultaneously with the data by the processor.

Additional aspects, advantages, and utilities of the present inventive concept will be set forth in part in the description which follows and, in part, will be obvious from the description, or may be learned by practice of the present inventive concept.

The foregoing is intended to be illustrative and is not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

Embodiments of the present inventive concept are illustrated by way of example in which like reference numerals indicate similar elements and in which.

Figure 1:
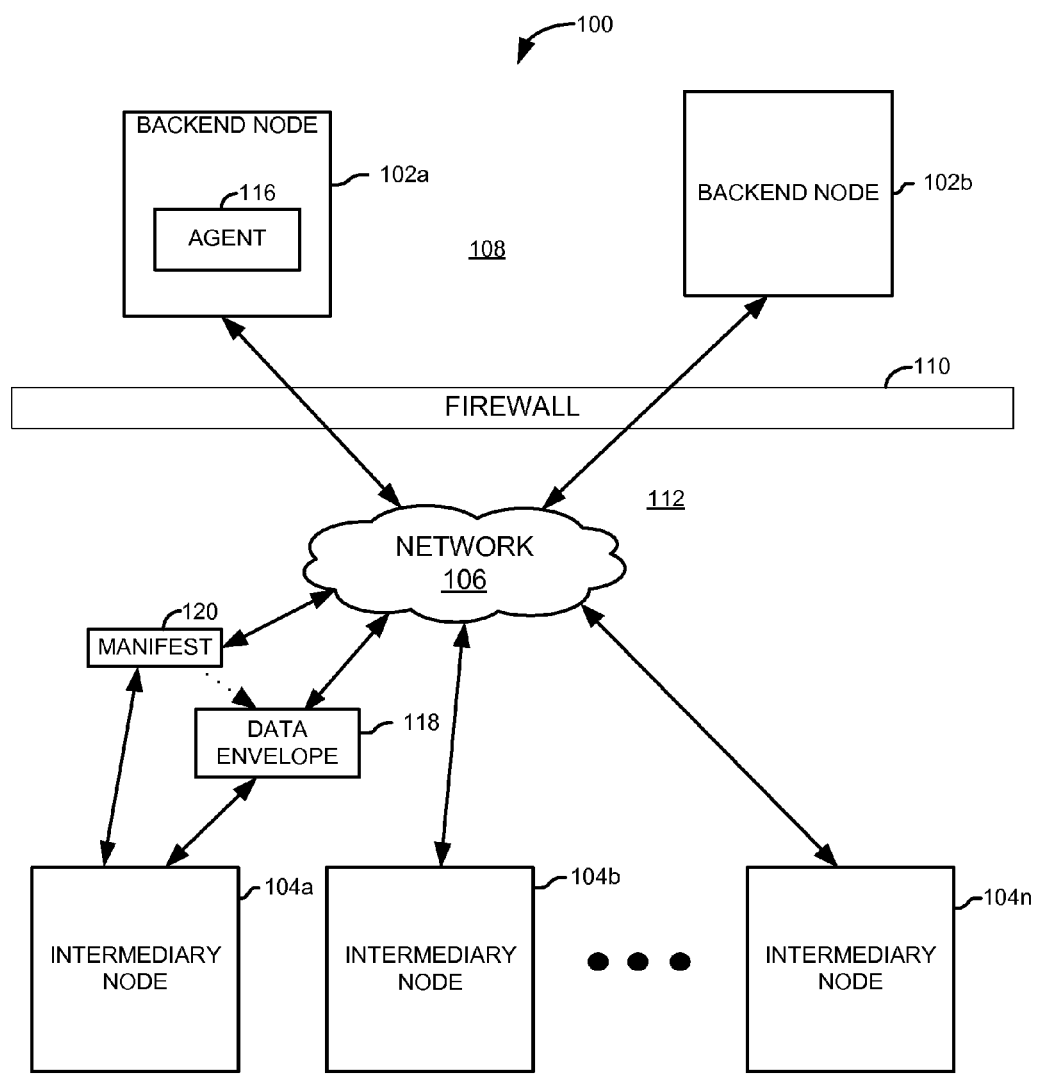
FIG. 1 illustrates an example secure communication system according to one embodiment of the present disclosure.

The drawing figures do not limit the present inventive concept to the specific embodiments disclosed and described herein. The drawings are not necessarily to scale, emphasis instead being placed on clearly illustrating principles of certain embodiments of the present inventive concept.

DETAILED DESCRIPTION

The following detailed description references the accompanying drawings that illustrate various embodiments of the present inventive concept. The illustrations and description are intended to describe aspects and embodiments of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

I. Terminology

In the following detailed description, terminology is used to describe features of the present inventive concept. For example, references to terms "one embodiment," "an embodiment," or "embodiments" mean that the feature or features being referred to are included in at least one aspect of the present disclosure. Separate references to terms "one embodiment," "an embodiment," or "embodiments" in this description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure as described herein are not essential for its practice.

Further, in certain situations, the term "logic" refers to hardware, firmware, software, and/or a combination thereof that is configured to perform one or more functions including, but not limited to, those functions of the present inventive concept specifically described herein or are readily apparent to those skilled in the art in view of the description. Such logic may include circuitry having data processing and/or storage functionality. Examples of such circuitry may include, but are not limited to, a microprocessor, one or more processors, e.g., processor cores, a programmable gate array, a microcontroller, an application specific integrated circuit, a wireless receiver, transmitter and/or transceiver circuitry, semiconductor memory, or combinatorial logic.

Logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium, e.g., electrical, optical, acoustical or other form of propagated signals such as carrier waves, infrared signals, or digital signals. Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content" generally refers to information transmitted as one or more messages, where each message(s) may be in the form of a packet, a frame, an Asynchronous Transfer Mode "ATM" cell, or any other series of bits having a prescribed format. The content may be received as a data flow, namely a group of related messages, within ingress data traffic. Content may include one or more types of data such as, but not limited to, text, software, images, audio, metadata and/or other digital data. One example of content may include web content, or any data traffic that may be transmitted using a Hypertext Transfer Protocol (HTTP), Hypertext Markup Language (HTML) protocol, or may be transmitted in a manner suitable for display on a Web browser software application. Another example of content includes electronic mail or email, which may be transmitted using an email protocol such as Simple Mail Transfer Protocol (SMTP), Post Office Protocol version 3 (POP3), or Internet Message Access Protocol (IMAP4). A further example of content includes an Instant Message, which may be transmitted using Session Initiation Protocol (SIP) or Extensible Messaging and Presence Protocol (XMPP) for example. Yet another example of content includes one or more files that are transferred using a data transfer protocol such as File Transfer Protocol (FTP) for subsequent storage on a file share.

The term "cluster" is used to describe a group of machines or servers grouped or clustered together and all performing a similar function and configured to operate together. For example, a cluster may include eight personal computers all connected via a network. A plurality of clusters, e.g., store and forward clusters, may exist in different locations across a system or network. Within each cluster, its servers are assigned and configured to perform one or more different tasks relative to one another. Each of the clusters may include a provisioning server, a polling server, a transmitting server, and/or a receiving server. Alternatively one or more tasks such as those performed by the provisioning server and the polling server may be consolidated into a single server. For instance, a cluster may refer to one or more elements configured to perform the functionalities necessary to function as an intermediary as described herein. Each cluster may in certain embodiments perform independently of one or more other clusters, with no routing necessary between such clusters.

The terms "task" and "work" are used interchangeably herein to refer to an act of transmitting and/or receiving data by an agent using one or more clusters.

The term "computerized" generally represents that any corresponding operations are conducted by hardware in combination with software and/or firmware.

The term "virtual machine" (VM) refers to a simulation of an electronic device that may be abstract or real, and is usually different from the electronic device conducting the simulation. A VM may be based on specifications of a hypothetical computer or emulate the computer architecture and functions of a real world computer. A VM may be one of many different types such as, for example, hardware emulation, full virtualization, para-virtualization, and/or operating system-level virtualization virtual machines.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As the present inventive concept is susceptible to embodiments of many different forms, it is intended that the present disclosure be considered as an example of the principles of the present inventive concept and not intended to limit the present inventive concept to the specific embodiments shown and described.

II. General Architecture

FIG. 1 illustrates an example secure communication system 100 according to aspects and embodiments of the disclosure. The system 100 includes one or more backend nodes 102a and 102b that are in communication with one or more intermediary nodes 104a-104n via a communication network 106. The backend nodes 102a and 102b exist in a secure area 108 that is formed by a firewall 110 that restricts unsolicited access to the backend nodes 102a and 102b. The intermediary nodes 104a-104n, however, exist in an unsecured area 112 in that they are not restricted from unsolicited access by the firewall 110. As will be described in detail below, at least one node 102a, 102b, or 104a-104n includes an agent 116 that functions as a broker to facilitate communication of one or more data envelopes 118 between at least one backend node 102a or 102b and at least one intermediary node 104a-104n in the unsecure area 108.

The agent 116 facilitates communication of the data envelope 118 from any one of the backend nodes 102a, 102b or intermediate nodes 104a-104n to any other node in the system. For example, the agent 116 may facilitate communication of the data envelope 118 from the backend node 102a to an intermediate node 104a-104n, from one intermediate node 104a-104n to another intermediate node 104a-104n, and/or from an intermediate node 104a-104n to a backend node 102a, 102b. In a more particular example, the agent 116 may facilitate transmission of the data envelope 118 from backend node 102a to backend node 102b by first transmitting the data envelope 118 from backend node 102b to intermediate node 102a, then from intermediate node 104a to intermediate node 104b, and then from intermediate node 104b to backend node 102b.

As shown, the agent is stored on, and executed by backend node 102a. However, other embodiments contemplate that the agent 116 may be stored and executed by any node (e.g., backend node or intermediary node) in the system. The backend node 102a comprises a provisioning node that executes the agent 116 and provisions the agent 116 to perform its functions as described herein below.

Additionally, although only one agent 116 is shown, other embodiments contemplate that the secure communication system 100 include multiple agents 116 that simultaneously arbitrate and broker communication of data envelopes 118 among the multiple nodes in the system.

The data envelope 118 generally includes a block of data that has been signed by a private key of the recipient node to receive the data envelope 118. The block of data may include any type of data. For example, the block of data may include big data that is terabytes or event exabytes in size.

Each backend node 102a, 102b, and intermediate node 104a-104n may include one or more servers, personal computers, mobile computers and/or other mobile devices, and other computing devices. The backend nodes 102a, 102b and/or intermediate nodes 104a-104n may also be referred to as endpoints or computer clusters. For example, one of the backend nodes 102a, 102b and/or intermediate nodes 104a-104n comprises a computer cluster or other type of computing environment having multiple computing devices that function together to perform one or more computing services. The nodes may communicate via wireless, wireline, and/or optical communications. The backend nodes 102a, 102b, and intermediate nodes 104a-104n each have one or more processors and executable instructions stored in volatile and/or non-volatile memory for performing the actions and/or steps described herein.

The communication network 106 can be the Internet, an intranet, or another wired and/or wireless communication network. In one embodiment, the backend nodes 102a, 102b and intermediate nodes 104a-104n communicate with one another using any suitable protocol or messaging scheme. For example, the backend nodes 102a, 102b and intermediate nodes 104a-104n communicates using a Hypertext Transfer Protocol (HTTP), extensible markup language (XML), extensible hypertext markup language (XHTML), or a Wireless Application Protocol (WAP) protocol. Nevertheless, it should be understood that the backend nodes 102a, 102b and intermediate nodes 104a-104n may communicate with each other using any suitable networking protocol.

Figure 2:
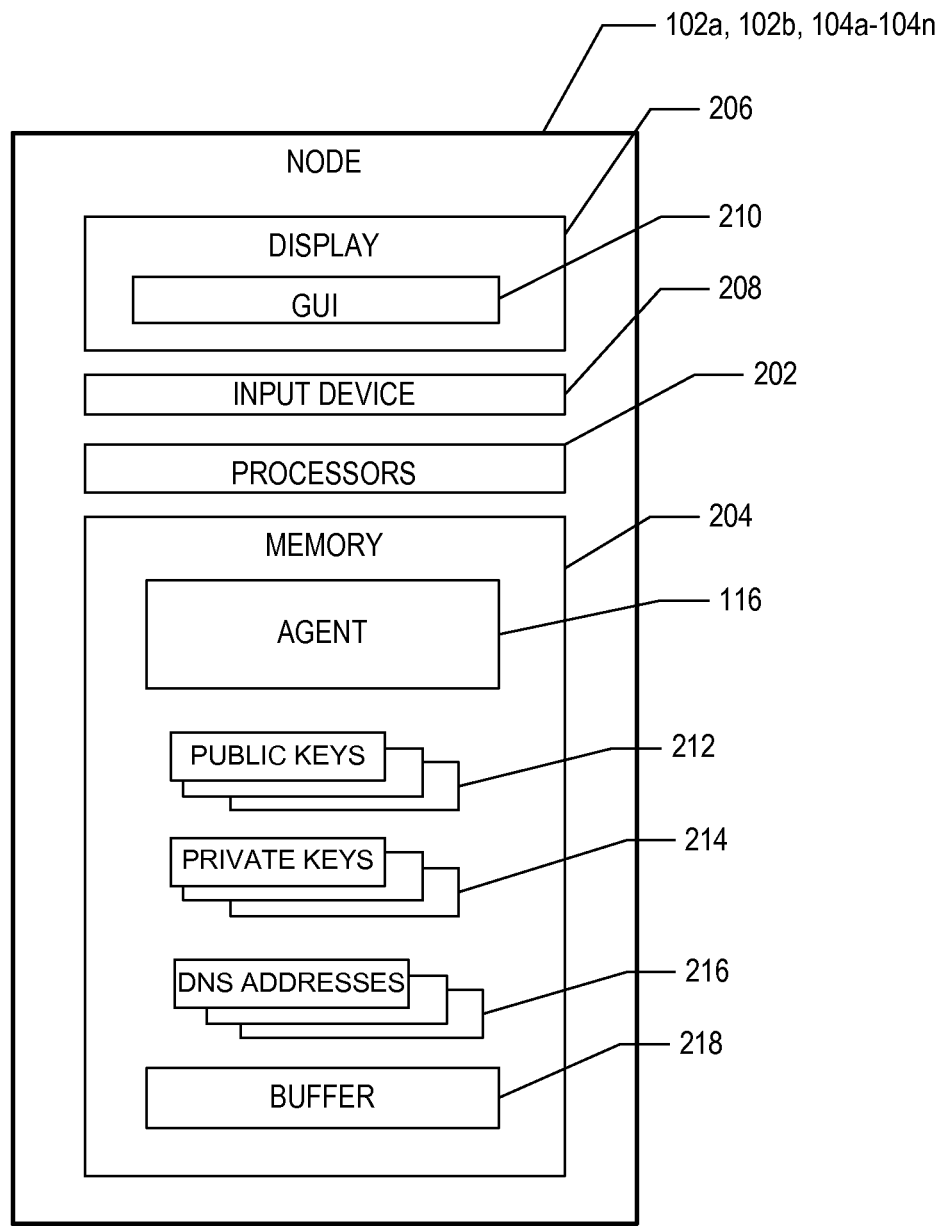
FIG. 2 illustrates an example backend node or intermediate node according to one embodiment of the present disclosure.

FIG. 2 illustrates an example backend node 102a or 102b or intermediate node 104a-104n according to one embodiment of the secure communication system 100. The backend node 102a or 102b/intermediate node 104a-104n is a computing or processing device that includes one or more processors 202 and one or more memory units 204. For example, the backend node 102a or 102b/intermediate node 104a-104n can be a computer cluster, a personal computer, such as a laptop or notebook computer, a workstation, or other processing device such as a personal digital assistant or a tablet computer. The backend node 102a or 102b/intermediate node 104a-104n may include a display 206, such as a computer monitor, for displaying data using a graphical user interface 148. The backend node 102a or 102b/intermediate node 104a-104n may also include an input device 208, such as a keyboard or a pointing device (e.g., a mouse, trackball, pen, or touch screen) to enter data into or interact with a graphical user interface 210. The backend node 102a or 102b/intermediate node 104a-104n receives data and/or communications from, and/or transmit data and/or communications to, other backend nodes 102a, 102b/intermediate nodes 104a-104n via the communication network 106.

The backend node 102a or 102b/intermediate node 104a-104n may include an agent 116 stored in the memory unit 204 and executed on the processors 202 to facilitate transmission of data envelopes from one backend node 102a or 102b/intermediate node 104a-104n to another backend node 102a or 102b/intermediate node 104a-104n. The memory unit 204 also stores the public keys 120, private keys 122, and DNS addresses 124 for each backend node 102a or 102b/intermediate node 104a-104n in the secure communication system 100.

The memory 204 also stores public keys 212, private keys 214, and domain naming service (DNS) keys 216 for each node used in the system. In one embodiment, the agent 116 performs a discovery process to find nodes in the system, and upon discovery of the nodes, performs an authentication process with each node to generate the public keys 212 and private keys 214, which are subsequently stored in the memory 204.

Figure 3:
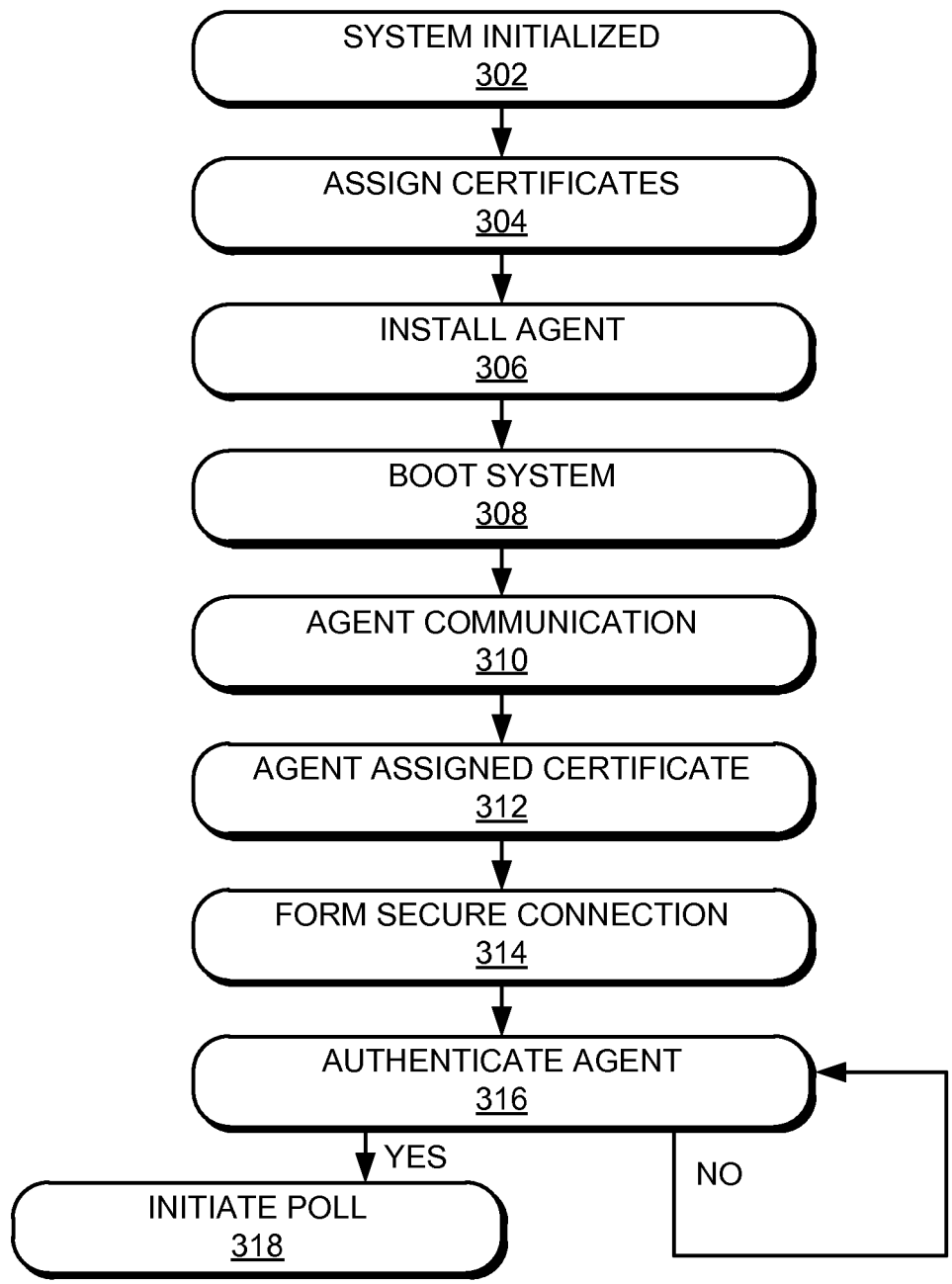
FIG. 3 illustrates an example process that may be performed for setting up operation of the secure communication system according to one embodiment of the present disclosure.

FIG. 3 illustrates an example process that may be performed for setting up operation of the secure communication system 100 according to the teachings of the present disclosure. At step 302, the system 100 is initialized by the provisioning node (e.g., backend node 102a) to generate credentials. In this manner, the system 100 is bootstrapped and a certificate authority, e.g., Trust Domain Certificate Authority (TDCA), and certificates are generated. At step 204, the provisioning node assigns certificates (e.g., public keys, and private keys) to each node in the system 100.

At step 306, the provisioning node installs the agent 116 in the system. That is, the provisioning node loads the agent 116 into a memory 204 of at least one backend node 102a or 102b and/or intermediate node 104a-104n initiates execution of the agent. The provisioning node may also upload the agent with a backend TDCA (i.e., a root certificate) and/or IP/DNS addresses for the backend nodes 102a, 102b and intermediate nodes 104a-104n. The agent 116 is in communication with each of the backend nodes 102a, 102b and intermediate nodes 104a-104n.

In one embodiment, the provisioning node performs a tasking process, which manages a communication sequence where a data envelope (i.e., signed block of data) is sent from the one node to another node in the system 100. The task may be created outside the backend to cause a data envelope 118 to be sent to the agent 116. In this manner, data may be presented to a backend node 102a, 102b in the secure area 108.

The provisioning node is configured to respond to a certificate signing request (CSR) by signing the request and injecting into the certificate an agent identifier for the agent 116, that is, the agent identifier is associated with the certificate. The agent identifier may be a base-64 encoded unique identification (UID) case sensitive binary large object or like identifier, e.g., a base-62 encoded universally unique identification version 4 (UUID4). Then, the provisioning node injects a well-defined object identifier (OID) that is registered into the certificate. A new unique identification number or UID is assigned for a predetermined period of time, e.g., a lifetime or lifespan, of the agent 116. In this manner, subtleties related to how a certificate hash, i.e., a mathematical function to convert or abbreviate large data to small data, is calculated are reduced or avoided, and renewal of certificates while maintaining identity over an extended period of time is enhanced. As a certificate is generated and returned to the agent 116, the certificate is pushed to the backend nodes using a subscription mechanism. This enables the system 100 to maintain a mapping of or track an agent identification certificate or a set of certificates.

In one embodiment, the agent 116 is preconfigured with certain assumptions, knowledge and/or backend logic. For example, the agent 116 may be configured with logic that the intermediate nodes 104a-104n are available and that independent communication between the agent 116 and each of the intermediate nodes 104a-104n is possible. Also, the agent 116 may be configured with logic that at least one communication route or path exists to each one of the intermediate nodes 104a-104n. At least one path between the agent 116 and each of the intermediate nodes 104a-104n may be used for broadcasting data to each of the intermediate nodes 104a-104n upon demand. When data is introduced (e.g., rolled out) to the intermediate nodes 104a-104n of the system 100, it is desirable to broadcast the data to as many of the intermediate nodes 104a-104n as possible to ensure the data remains accessible to the agent 116. When the data is distributed or retrieved across the network 10, the agent 116 is configured to logically route one or more of the intermediate nodes 104a-104n with one or more specific pieces of data. It is foreseen that new ones of the intermediate nodes 104a-104n may be added to the system 100 without updating communication paths by adding information regarding such new intermediate nodes 104a-104n to the backend logic.

In one embodiment, the agent 116 is configured with one or more DNS addresses to enable hopping of the data envelope 118 between one or more of the intermediate nodes 104a-104n ("DNS hopping") to reach its destination. The DNS addresses configured in the agent 116 may be determined according to any suitable DNS routing protocol or other DNS accessing technique. For instance, the agent 116 may be configured with an internal DNS address to point to backend node 102a or 102b and/or with an external DNS address to point to an intermediate node 104a-104n. For purposes herein, "internal DNS" refers to one or more Domain Name Service servers behind the firewall 110 in the secure area 108, and "external DNS" refers to one or more Domain Name Service servers in front of the firewall 110 in the unsecured area 112. Such a DNS protocol overcomes a deficiency in conventional systems wherein, among other issues, an agent must be reconfigured every time a new server and/or cluster is rolled out or made accessible to the agent. A backend node 102a, 102b includes instructions regarding how to access a number of real DNS addresses to avoid illicit redirection of the agent 116. Upon obtaining a certificate generated on the backend and authenticating such, the DNS record is changed.

Upon execution of the aforementioned initializing steps 302, 304, and 306, the system 100 is initialized and ready for use in accordance with the present inventive concept. The initializing steps 302, 304, and 306 need not be repeated unless a user of the system 100 desires to update or reconfigure the system 100.

At step 308, the system 100 is turned on or booted. Upon booting of the system 100, the agent 116 communicates with the provisioning node using a protocol to encrypt information for transmission over the network, such as the Internet, at Step 310. The protocol used for transmission may be a Secure Sockets Layer (SSL) protocol, a simple certificate enrollment protocol (SCEP), and/or any other suitable communication protocol. The agent 116 acquires and is assigned to a certificate, such as a PKI certificate, at step 312. The certificate assigned to the agent 116 is signed by a trusted domain, such as an Agent Trust Domain, which is controlled by the system 100.

At this point in the process, the agent 116 has the certificate, and the system 100 is configured to form a secure connection (SSL connection) to one or more of the intermediate nodes 104a-104n based on a list of the intermediate nodes 104a-104n, at step 314. The list of the intermediate nodes 104a-104n may be formed and installed in the agent 116 during any one or more of the initializing steps 302, 304, and 306 of the system 100. The list may include a ranking of the intermediate nodes 104a-104n by priority based on pathway or location within the system 100. For instance, one of the intermediate nodes 104a-104n within a local area network (LAN) or within the secure area 108 may be listed first on the list with a highest priority while other ones of the intermediate nodes 104a-104n outside of the LAN or within the unsecure area 108 may be listed thereafter. The list of the intermediate nodes 104a-104n includes a variety of information associated with each of the intermediate nodes 104a-104n including, but not limited to, communication information such as IP address, DNS information, and the like.

Each of the intermediate nodes 104a-104n is configured to attempt to authenticate the certificate of the agent 116 by confirming that the certificate of the agent 116 is signed by the Agent TDCA at step 316. If the certificate of the agent 116 has been authenticated, the agent 116 is configured to initiate a process to poll for a new task or new work to be performed by the agent 116, at step 318. The agent 116 will continue to poll for work at predetermined frequencies, as discussed hereafter, until the system 100 is turned off and/or (re)booted, at step 130. If the certificate of the agent 116 is not authenticated, the system 100 will continue to attempt to authenticate the certificate of the agent until, for example, step 308 is repeated, that is, the system 100 is (re)booted.

Figure 4:
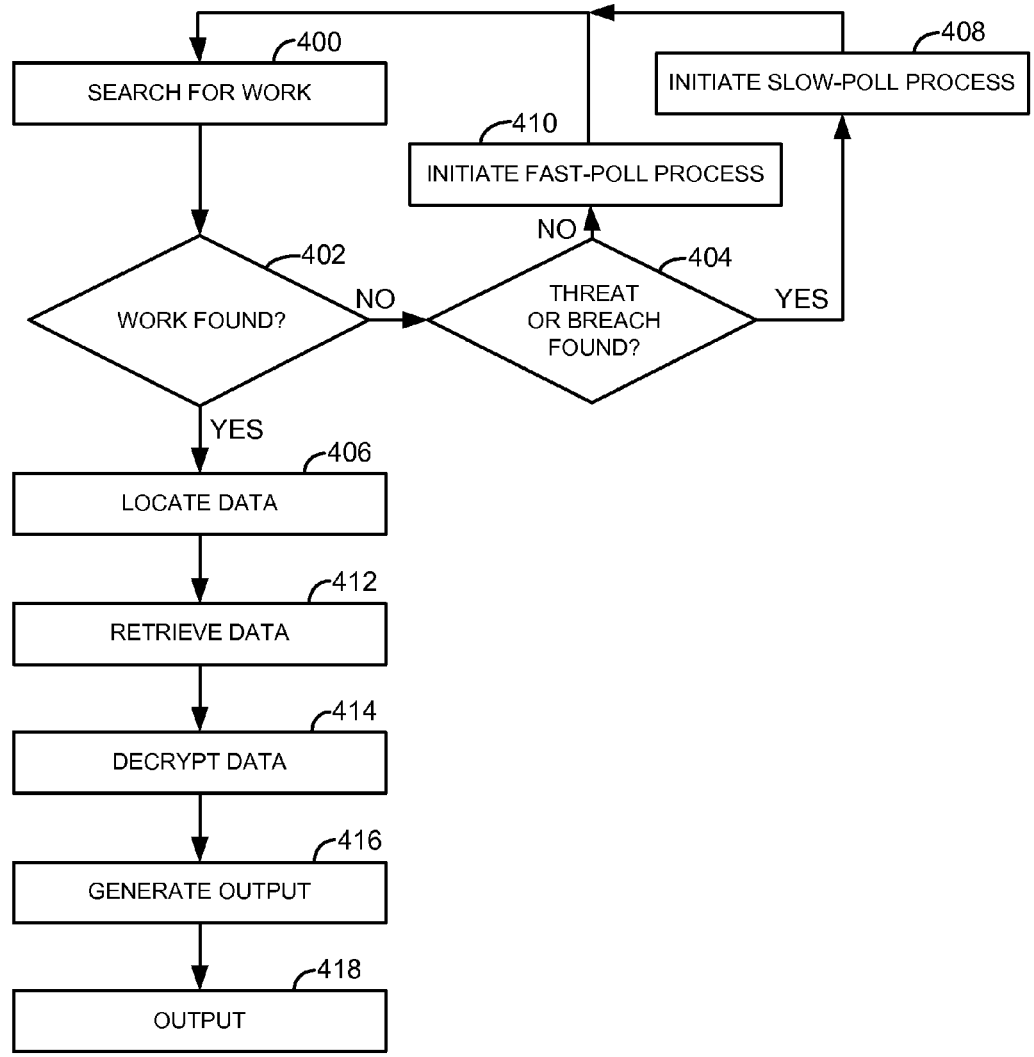
FIG. 4 illustrates an example process that may be performed by the system to poll for a new task or new work according to one embodiment of the present disclosure.

FIG. 4 illustrates an example process that may be performed by the system 100 to poll for a new task or new work according to one embodiment of the present disclosure. The agent 116 initiates the poll for work by generating and transmitting a signal across the system 100 in attempt to identify new work, at step 400. For instance, the agent 116 may be configured to open a hypertext transfer protocol secure (HTTPS) connection to each of the intermediate nodes 104a-104n, and poll the intermediate nodes one at a time or simultaneously for work. The polls are performed periodically or aperiodically and are each encrypted, such as in an encryption envelope. Feedback to the poll for work transmitted by the agent 116 is typically received by the agent 116 within seconds, irrespective of whether new work exists or does not exist. At step 402, if no new work exists, processing continues at step 404; otherwise processing continues as step 406 in which the agent 116 is presented with at least one item detailing the new work or a list of new work. The at least one item may be a URI where data associated with the new work may be located via one or more of the intermediate nodes 104a-104n. It is important to note that, with each poll, the agent 116 determines whether the work has already been initiated (by another agent or previously by the agent 116), and whether the work has been marked as aborted. If the work has not been aborted, the agent 116 could be asked to initiate an abort. The agent 116 is configured to regularly check to identify if work has been marked aborted so that any connection associated therewith can be terminated, thereby forcing an immediate poll of the data.

At step 404, the agent identifies whether a threat or breach in the security of the data occurs. If not, processing continues at step 408 in which the slow polling technique as described above is initiated. However, if a threat or breach in the security of the data has been identified, processing continues at step 410 in which a fast-poll process is implemented.

In one embodiment, the fast-poll process is implemented whereby a straight HTTP (non-secure) request is issued from the agent 116 to at least one of the backend nodes 102a, 102b and/or intermediate nodes 104a-104n. In this process, an agent 116 presents an AgentID and polls to determine the presence of any work. Unlike that described above, the fast-poll process involves untrusted communication and may not be resilient to compromise. It is, however, convenient in that the speed and efficiency of the polling process may be enhanced. If the agent 116 acquires work following the fast-poll process, the work is obtained via authentic communications and/or a full or complete polling process (a pull for work) according to certain embodiments. It is foreseen that, despite its disadvantages with respect to process security, the fast-poll process may be utilized in relatively low-threat environments, such as when a present threat or breach has not been identified in the system 100. In certain embodiments, the fast-poll process will be performed more frequently than the more secure polling process of other embodiments described herein. The rate of polling directly affects how often data is transmitted across the network; that is, a faster polling rate generally provides an increased rate of data envelope transfer while a lower polling rate generally provides a decreased rate of data envelope transfer. A specific rate of polling may be determined by one or more of the backend nodes 102a, 102b and/or intermediate nodes 104a-104n, which may be, for example, every few seconds. In this manner, a full "handshake" is required less frequently when using fast-polling when the fast-poll process is executed at moderate intervals. For example, a full handshake may be performed approximately every thirty minutes when fast-polling is conducted every one minute. It should be noted that, even if fast-polling is employed, normal and more secure polling by the agent 116 is still performed on a regular basis in some embodiments.

After processing either of steps 408 or 410, the agent repeats step 400 to poll for work again after a specified period of time elapses.

The agent 116 performs a search for data associated with the new work by searching each of the intermediate nodes 104a-104n within the system 100 based on the at least one item or the list, at step 406. The agent 116 does not open a connection to any of the intermediate nodes 104a-104n unless one of the intermediate nodes 104a-104n reaches or possesses a specified threshold amount of data to be transmitted. In this manner, a trickle effect is prevented in which low volume data transmissions cause undue congestion, thereby minimizing adverse effects caused due to faults and heightening fault tolerance of the system 100. The search for new work continues until the agent 116 locates data to be transmitted by one of the intermediate nodes 104a-104n, at which point the agent 116 attempts to retrieve the data, at step 412. In one embodiment, the agent 116 only attempts to retrieve data associated with the new work when the agent 116 has sufficient capacity to perform the new work. Additionally, the agent 116 will retrieve the data via an SSL connection or the like and decrypt it with a key and/or code.

Additionally at step 406, the agent 116 authenticates each certificate presented by each one of the intermediate nodes 104a-104n where data resides and is accessed by the agent 116, such as during an SSL authentication process or handshake, by ensuring that each of the certificates is signed by the backend configuration node. During a handshake, each one of the intermediate nodes 104a-104n where data resides and is accessed by the agent 116, authenticates the agent 116, thereby performing two-way or mutual authentication and ensuring security of the data. In some cases, performing the handshake can be complex and time consuming. Each one of the intermediate nodes 104a-104n contains agent authentication information associated with the agent 116, and in some cases, the intermediate nodes 104a -104n may require a root certificate to communicate with the agent 116. The system 100 is configured to use a variation of cache credentials, which is an SSL feature referred to herein as "client caching." In a client caching process, the system 100, during an initial handshake, is configured to generate a symmetric key that is known or possessed by both the agent 116 and one or more of the intermediate nodes 104a-104n which are to transmit or receive data via the agent 116. In one embodiment, as part of the handshake, one of the intermediate nodes 104a-104n is configured to return a doubly encrypted binary large object (BLOB) containing symmetric key and resume information, which is retained and presented by the agent 116 during subsequent sign on. In this manner, the binary large object is transmitted from the agent 116 to the one of the intermediate nodes 104a-104n where data resides and is accessed by the agent 116. If the one of the intermediate nodes 104a-104n is able to decrypt the binary large object, the SSL handshake process is short circuited and previously negotiated terms are used.

It is foreseen that each of the intermediate nodes 104a-104n may include a server configured to perform as the provisioning node, that is, operable to configure the agent 116. Such authentication of the agent 116 may occur using a certified authority (CA) certificate, a SCEP, or the like to initiate or sign the agent 116. The nodes configured to perform as the provisioning node are each configured to issue a specific certificate associated with the agent 116 and also separately and independently issue an agent ID (e.g.,. an OID) that is inserted into the certificate. Thus, the system 100 may utilize two unique identifiers (e.g., a certificate and an agent identifier) so that the certificate can be updated without loss of identification information of the agent 116.

The agent 116, using code or other instructions, decrypts the data using a private key, at step 414. As part of the decryption process, the agent 116 validates a signature presented by the private key, for example, using the backend configuration node. If the agent 116 determines the signature presented by the private key is valid, the agent 116 checks a certificate revocation list (CR) and, if the certificate is not revoked, parses the data and begins to generate output based on the data in the form of a data payload, at step 416. The data payload is a grouping or collection of data, e.g., related data in a packet or file, that includes an agent certificate and is signed using a private key for later authentication, which results in a signed envelope via, for example, PKCS7 (CMS). The signed data envelope is encrypted using a public key from the agent 116 at a predetermined destination of the data envelope. It should be noted that a cipher is a symmetric cipher having a key that is encrypted using a public key of the agent's certificate. A corresponding private key is not included in the encryption envelope of embodiments of the present inventive concept.

The output is transmitted by the agent 116 at step 410, which may be performed via one or more streams of data. For example, a backend node 102a or 102b is configured to broadcast the encrypted envelope to one the intermediate nodes 104a-104n. The transmission of the data by the agent 116 may be cryptographically opaque to the intermediate nodes 104a-104n. The agent 116 is equipped with a base uniform resource identifier (URI) (e.g., as part of a binary large object (BLOB)) or in an envelope. The agent 116 may output the data via a write to the base URI, which is an address mechanism. In this manner, each of the intermediate nodes 104a-104n is able to transmit data to a receiving node using a base URI associated with that node. As part of the data output of step 410, the agent 116 is configured to compress the data, sign the data, and encrypt the data, which may be performed by the agent 116 in this order quickly, on the fly, and with little notice.

The output data is encrypted along with a manifest 120 (e.g., an administrative record) that describes the work performed either partially or completely, and may include metadata associated with the data. The metadata may include a list, cluster identification information, and/or offset/length data associated with each piece of the data payload. The manifest may be used to determine completeness of the data in a buffered memory at each of the intermediate nodes 104a-104n, which may contain metadata and other data. The manifest may also be used to reconstruct or "sew" together pieces of the data in case of any communication interruption or other undesirable event that occurs during transfer of the data. Thus, in preferred embodiments the manifest contains a sufficient amount of metadata to piece together various pieces of the data payload. The manifest is generated and coupled to the work before the agent 116 outputs the data to the intermediate nodes 104a-104n, but after the agent 116 has completed all work associated with the task, e.g., at the generate output step 416.

Other new tasks may be present and/or identified or identifiable by the agent 116, when the agent 116 generates the manifest. In one embodiment, the manifest may be generated in JavaScript Object Notation (JSON) using a manifest URI. The manifest URI may include a HTTP address to which a manifest could be stored using, for example, a HTTP PUT request. The manifest URI is separate from the base URI previously described. A successful PUT to the HTTP address is interpreted by at least one of the intermediate nodes 104a-104n as a notification of completion in which the notification may be relayed to the backend. The manifest document may be compressed, signed, and encrypted as is the data such that its content is opaque to any of the intermediate nodes 104a-104n utilized by the system 100.

Using the manifest and the buffered memory at each of the intermediate nodes 104a-104n, the agent 116 is configured to determine completeness of data stored on the intermediate nodes 104a-104n and complete the data, for example, by identifying and moving to a point in the data envelope, and transmitting data from the point in the data envelope until the entire data envelope has been transmitted. For instance, if a connection between one or more of the intermediate nodes 104a-104n and the agent 116 is prematurely terminated, disconnected or dropped, the system 100 may utilize the manifest in attempt to correct any issues associated with such.

Dropping can occur at any point as the agent 116 performs the aforementioned processes. There are no ideal breaking points in data given that a significant amount of processing may have already been performed. For instance, prior to outputting the data at step 410, the agent 116 has already compressed the data, signed the data, and encrypted the data. If the connection is dropped, it is quite possible that at least a subset of the data may not have arrived at the receiving backend node 102a or 102b or intermediate node 104a-104n. For heightened fault tolerance, the system 100 places the data in a buffer 218 (e.g., a circular buffer) as the data is streamed. Thus, if the connection is dropped by one of the intermediate nodes 104a-104n, the agent 116 is configured to reconnect to the one of the intermediate nodes 104a-104n, e.g., during one or more processes such as but not limited to a HEAD process. A HTTP HEAD request is one of a plurality of defined actions, which supplements an underlying transport protocol (HTTP/1.1) used by the system 100. The HEAD request is used by the system 100 to determine how many "bytes" of a stream were successfully received by the receiving backend node 102a or 102b or intermediate node 104a-104n in case of a disconnect as the data is streamed. In other words, the HEAD request enables the agent 116 to determine how much data successfully arrived at the one or more of the intermediate nodes 104a-104n and to, in reliance on the buffer 218, rewind and start from where it should be based on the determination. In this manner, the system 100 may minimize adverse effects caused by faults, thereby heightening fault tolerance.

In some instances, overlap of data may exist, which is likely to occur if a connection has been dropped, which may be detected as discussed herein below. If there is such an overlap, decryption of the data may be difficult to accomplish. The system 100 is configured to minimize any overlap by utilizing the buffer 218. With respect to a size of the buffer 218, it may be at least as large as a TCP window, and in some cases set to at least double the size of the TCP window. The buffer size is set via a buffer size setting operation that occurs simultaneously with or immediately after a TCP handshake operation. The buffer size setting operation causes the size of the TCP window to be determined using TCP window size determining algorithm. For instance, if the size of the TCP window is determined to be 64 kb, the algorithm may be applied to determine that a buffer size that is at least 128 kb may be used.

If the agent 116 cannot perform one or more of the aforementioned functions, the agent may conclude that the task has failed and in turn, attempt to regenerate the data. If the agent 116 cannot regenerate the data, the agent 116 is configured to generate a failure alert to the upstream node. If the agent 116 cannot communicate to the upstream node (e.g., if a node such as a portable laptop has moved from one network to another), the agent 116 is configured to rewind the buffer 218 entirely, that is, rewind to a beginning or starting point of the data transmission, and re-transmit the data to the receiving node.

The system 100 of the present inventive concept may be configured to achieve network agnosticism. For example, if the agent 116 is actively transmitting data to one of the intermediate nodes 104a-104n while a connection therebetween is terminated and the agent 116 is unable to reconnect to the one of the intermediate nodes 104a-104n, the agent 116 may fall back to the top of the list of the intermediate nodes 104a-104n and will attempt to connect to a next one of the intermediate nodes 104a-104n. Once the agent 116 is able to connect to one of the intermediate nodes 104a-104n, the agent 116 will continue to push data to the one intermediate node 104a-104n.

The system 100 may cause data for a task to be distributed across multiple intermediate nodes 104a-104n. If the agent 116 is unable to communicate with one of the intermediate nodes 104a-104n, the agent 116 may pause the data transfer and repeatedly attempt to reconnect to the one intermediate node 104a-104n. The system 100 is configured to continue this process until an external instruction is issued, such as an instruction received from a controller of the system 100. If the instruction is not received and the agent 116 is unable to reconnect to the one intermediate node 104a-104n, the system 100 will be in a failed state during the task. Any work in process and being performed by the system 100 does not survive reboot and will need to be restarted in some embodiments. Any work not completed by the agent 116 will still be active and/or associated with and identifiable via one or more of the intermediate nodes 104a-104n, so that the work not completed may be restarted and successfully completed by the agent 116.

The system 100 may be configured to avoid issues related to virtual machine (VM) duplication. VM duplication typically involves a process of a virtualized environment in which a hypervisor duplicates or clones another VM having most or all of the same credentials of the VM from which it was created. Nevertheless, this behavior may create a security problem in that each VM in the system is no longer uniquely identifiable from a data integrity point of view. In such a scenario, the agent 116, having been previously provisioned by the provisioning node, includes a unique certificate and key to an existing VM, but not to another instance of the existing VM that has been duplicated. To address such, the agent 116 obtains a sequence ID (SEQID) upon initial check-in by targeting an algorithmic solution using a nonce approach. A nonce is an arbitrary number used only once in a cryptographic communication. The agent 116 is configured to present the SEQID every time the agent 116 signs in. The intermediate nodes 104a-104n are configured to record and track the last and next-to-last nonce. If any of the intermediate nodes 104a-104n identify any request that is out-of-sequence, that intermediate node 104a-104n requests that the agent 116 poll more frequently and test for failures with the VM. Using this technique, the duplicate VM will fail, at which point the intermediate nodes 104a-104n may then label the duplicate VM as a clone and instruct the agent 116 to re-provision and obtain a new identifier for the duplicate VM.

In the foregoing description, the present inventive concept is described with reference to specific exemplary embodiments thereof. It will, however, be evident that various modifications and changes may be made thereto without departing from the broader spirit and scope of the present inventive concept as set forth in the appended claims.

This description of the present inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Having now described the features, discoveries, and principles of the present disclosure, the manner in which embodiment of the present disclosure are constructed and used, the characteristics of the construction, and advantageous, new and useful results obtained; the new and useful structures, devices, elements, arrangements, parts and combinations, are set forth in the appended claims.

The following claims are intended to cover all of the generic and specific features of the present disclosure herein described, and all statements of the scope of the present inventive concept, which, as a matter of language, might be said to fall there between.

What is claimed is:

1. A method of communicating using a system configured to exchange data via at least two nodes, the method comprising:
    executing an agent loaded within a memory of a node that is different than a firewall and located behind the firewall of the system, the agent being configured with (i) an internal Domain Name System (DNS) address directed to one of the at least two nodes located in the secured area behind the firewall, (ii) an external DNS address directed to another one of the at least two nodes located in an unsecured area in front of the firewall, and (iii) a certificate, wherein the certificate comprises an identifier for the agent;
    establishing a communication link for data payload transmission between one of the at least two nodes and the agent and the data payload being signed using a private key to produce an envelope, the establishing of the communication link includes an authentication of the agent utilizing the certificate;
    encrypting the envelope using a public key associated with the agent; and
    performing, by the agent, a poll of the one of the at least two nodes for a task or work in accordance with a first polling technique or a second polling technique based on the agent identifying a type of communication environment.

2. The method of claim 1, further comprising compressing the data within the data payload and signing the payload containing the data using a private key of the agent to produce the envelope.

3. The method of claim 1, further comprising providing the public key by the agent to a predetermined destination of the envelope.

4. The method of claim 1, wherein the performing of the poll for the task or work in accordance with the first polling technique comprises performing the poll in accordance with a fast polling technique that is initiated by a hypertext transfer protocol (HTTP) request when the agent identifying the type of communication environment being a detected threat or breach in security of the data, the fast polling technique provides an increased rate in transfer of the envelope than the second polling technique.

5. The method of claim 4, wherein the performing of the poll for the task or work in accordance with the first polling technique comprises performing the poll in accordance with a fast polling technique that is initiated by a hypertext transfer protocol secure (HTTPS) request when the agent has not identified the type of communication environment being a detected threat or breach in security of the data.

6. The method of claim 1, further comprising utilizing, by the at least two nodes, a root certificate to communicate with the agent.

7. The method of claim 1, further comprising providing the agent with information associated with the at least two nodes, wherein the information associated with the at least two nodes includes an Internet Protocol (IP) address and Domain Naming Service (DNS) information.

8. The method of claim 1, wherein at least one of the at least two nodes comprises a provisioning node configured to certify the agent.

9. The method of claim 1, wherein the certificate comprises at least one of a certified authority (CA) certificate or a simple certificate enrollment protocol (SCEP) for the authentication of the agent.

10. The method of claim 1, wherein the authentication of the agent comprises a two-way authentication process between the agent and the at least two nodes.

11. The method of claim 1, wherein the performing of the poll by the agent comprises initiating the poll, via the agent, by generating and transmitting a signal across the system and to the at least two nodes in attempt to identify a task.

12. The method of claim 11, wherein the signal is sent to only one of the at least two nodes at a time.

13. The method of claim 11, wherein the initiating of the poll comprises transmitting the poll periodically or aperiodically and encrypting the envelope across the system at intervals alternating between the at least two nodes.

14. The method of claim 11, wherein when the task is not identified, repeating, by the agent, the initiating of the poll after a predetermined time period has elapsed.

15. The method of claim 11, further comprising determining, by the agent, that the task has been identified when the agent receives at least one item detailing the task in response to the poll initiated by the agent.

16. The method of claim 11, wherein when the task is identified, (i) locating and retrieving, by the agent, data associated with the task, (ii) decrypting the data, (iii) generating an output associated with the data, and (iv) transmitting the output.

17. The method of claim 11, further comprising compressing, signing, and encrypting the output generated by the agent.

18. The method of claim 11, further comprising when the task is not identified, repeating initiating of the poll at a specified rate according to whether the system is experiencing a threat or a data breach.

19. The method of claim 18, further comprising resetting the rate so that polls are initiated at a faster rate when the system is experiencing the data breach.

20. The method of claim 18, further comprising resetting, by at least one of the two nodes, the polling rate based on whether the system is experiencing the data breach.

21. The method of claim 16, further comprising locating, by the agent, the data associated with the task via a uniform resource indicator (URI).

22. The method of claim 16, further comprising:
retrieving, by the agent, the information associated with the task via a secure socket layer (SSL) connection; and
decrypting, by the agent, the information associated with the task via at least one of the public key and the private key.

23. A communication node comprising:
a memory configured to store an agent operating within a device located behind a firewall and the device being different from the firewall, the agent being configured with (i) an internal Domain Name System (DNS) address directed to one of at least two nodes located in a secured area behind the firewall, (ii) an external DNS address directed to another one of the at least two nodes that is located in an unsecured area in front of the firewall, and (iii) a certificate, wherein the certificate comprises an identifier for the agent; and
a processor communicatively coupled to the memory, the processor to execute the agent to
(a) establish a communication link for data payload transmission with a second communication node being a node of the at least two nodes by authenticating the agent utilizing the certificate, wherein the data payload is signed using a private key to produce an envelope,
(b) encrypt the envelope using a public key associated with the agent, and
(c) performing, by the agent, a poll of at least the second communication node for a task or work in accordance with a first polling technique or a second polling technique based on the agent identifying a type of communication environment.

24. The communication node of claim 23, wherein the processor is further configured to execute the agent to compress the data and sign the data using the private key.

25. The communication node of claim 23, wherein the processor is further configured to execute the agent and cause the agent to perform the poll for the task or work in accordance with the first polling technique being a fast polling technique that is initiated by a hypertext transfer protocol (HTTP) request when the agent identifying the type of communication environment being a detected threat or breach in security of the data, the fast polling technique provides an increased rate in transfer of the envelope than the second polling technique.

26. The communication node of claim 25, wherein the processor is further configured to execute the agent and cause the agent to perform the poll for the task or work in accordance with the second polling technique being a slow polling technique that is initiated by a hypertext transfer protocol secure (HTTPS) request when the agent has not identified the type of communication environment being a detected threat or breach in security of the data.

27. The communication node of claim 23, wherein the processor is further configured to execute the agent to perform the poll of at least the second communication node by at least generating and transmitting a signal to the at least two nodes in attempt to identify the task.

28. The communication node of claim 27, wherein the processor being configured to perform the poll by sending a signal to only one of the at least two nodes at a time.

29. The communication node of claim 28, wherein the processor being configured to perform the poll by transmitting the poll periodically or aperiodically and encrypting the envelope at intervals alternating between the at least two nodes.

30. The communication node of claim 28, wherein when the task is not identified, the processor, executing the agent, initiates the poll after a predetermined time period has elapsed.

31. The communication node of claim 28, wherein when the task is identified, by the processor executing the agent by at least (i) locating and retrieving data associated with the task, (ii) decrypting the data, (iii) generating an output associated with the data, and (iv) transmitting the output.

32. The communication node of claim 23, wherein the processor, executing the agent, to reset a rate so that polls including the poll are initiated at a faster rate upon the agent identifying the detected threat or breach.

* * * * *